US012719854B2

(12) United States Patent
Gormley

(10) Patent No.: US 12,719,854 B2
(45) Date of Patent: Aug. 25, 2026

(54) AUTOMATED COMPUTING OPERATION CONFIGURATION BASED ON DELTA PARAMETER

(71) Applicant: The Toronto-Dominion Bank, Toronto (CA)

(72) Inventor: Breena Patricia Gormley, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 386 days.

(21) Appl. No.: 18/471,599

(22) Filed: Sep. 21, 2023

(65) Prior Publication Data

US 2025/0106201 A1 Mar. 27, 2025

(51) Int. Cl.
*H04L 9/40* (2022.01)

(52) U.S. Cl.
CPC .................................. *H04L 63/083* (2013.01)

(58) Field of Classification Search
CPC ..................................................... H04L 63/083
See application file for complete search history.

(56) References Cited

U.S. PATENT DOCUMENTS 10,558,614 B2 * 2/2020 Kuruvada ........... G06F 16/2255
11,023,967 B1 6/2021 Schlesinger et al.
2019/0019246 A1 1/2019 Bowman et al.
2020/0104911 A1 * 4/2020 Suvajac ................... G06N 3/04
2021/0390875 A1 12/2021 Ranganathan et al.
2022/0164698 A1 * 5/2022 Chaudhary .......... G06N 3/0464
2022/0188785 A1 6/2022 Miller et al.
2022/0197306 A1 * 6/2022 Cella ................... G05D 1/0297

* cited by examiner

*Primary Examiner* — Sm A Rahman
(74) *Attorney, Agent, or Firm* — Rowand LLP

(57) ABSTRACT

A method includes: using an access token, obtaining account data associated with a particular account at a data provider system via an access interface associated with the data provider system; receiving inputted data from a client device associated with the particular account at the computing system; based on the account data and the inputted data, determining a current metric and a future metric; determining a delta parameter based on the current metric and the future metric; providing, at the client device, a selectable option to initiate an automated computing operation based on the delta parameter; and after activation of the selectable option at the client device, configuring the automated computing operation to be periodically performed based on the delta parameter. Determining the current and the future metric may include passing at least a portion of the account data and the inputted data to a machine learning algorithm.

16 Claims, 12 Drawing Sheets

AUTOMATED COMPUTING OPERATION CONFIGURATION BASED ON DELTA PARAMETER

TECHNICAL FIELD

The present application relates to computing operation configuration systems and, more particularly, to methods and systems for configuring periodic automated computing operations.

BACKGROUND

Certain computing operations are often configured manually based on user input at a computing device, such as at an operator terminal. For example, database operations including transfer operations are often configured as manual processes.

Such configuration techniques may result in configuration errors due to, for example, erroneous input. Further, by relying on such configuration techniques, the computing operations may, once configured, be static operations that do not adapt to changing conditions or are, at least, slow to adapt to such changing conditions.

Thus, there is a need for improved systems and methods for configuring computing operations.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
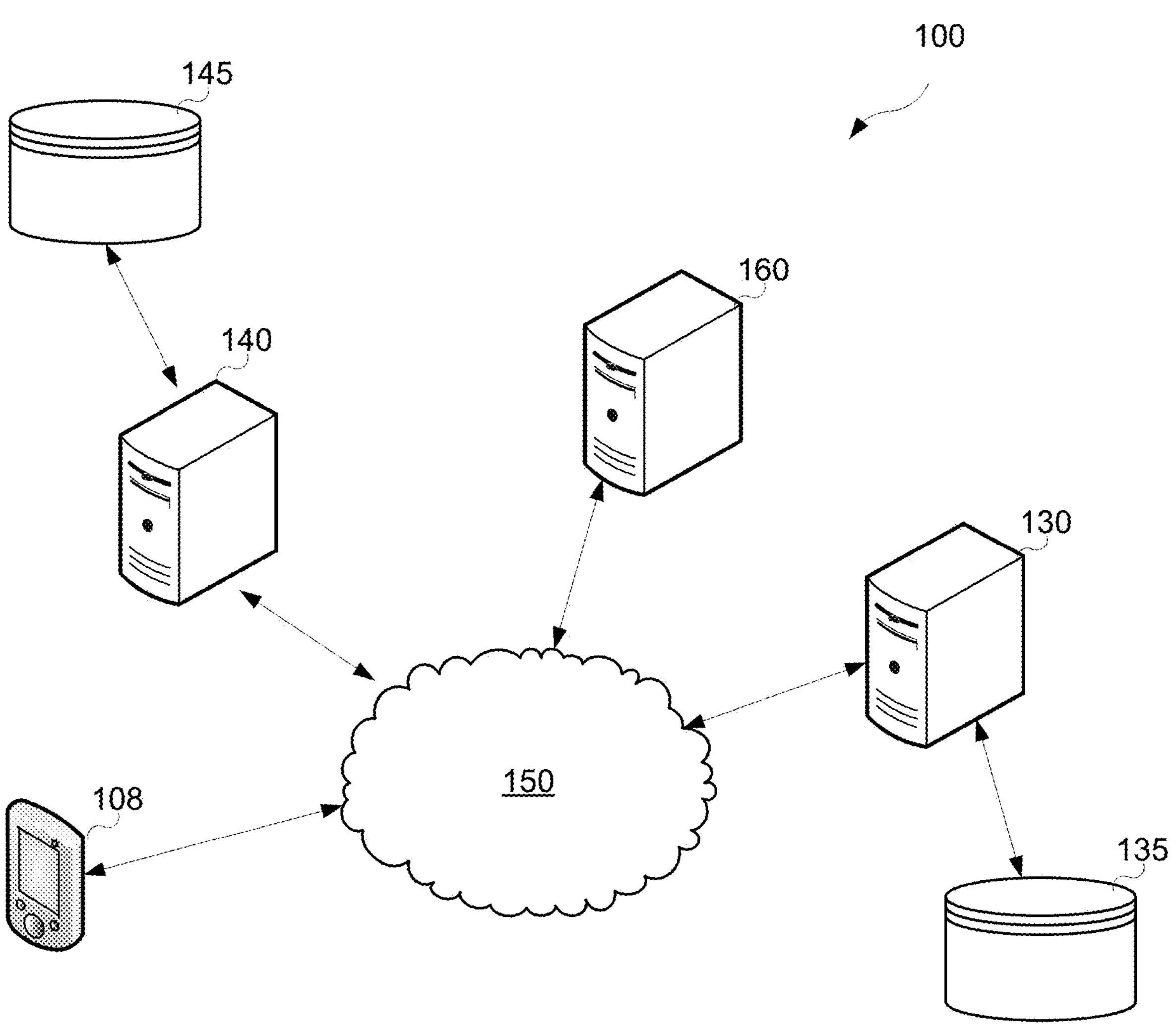
FIG. 1 is a schematic operation diagram illustrating an operating environment of an example embodiment.

In accordance with one aspect of the present invention, there is provided a computer-implemented method. The method may include: using an access token, obtaining account data associated with a particular account at a data provider system via an access interface associated with the data provider system; receiving inputted data from a client device associated with the particular account at the computing system; based on the account data and the inputted data, determining a current metric and a future metric; determining a delta parameter based on the current metric and the future metric; providing, at the client device, a selectable option to initiate an automated computing operation based on the delta parameter; and after activation of the selectable option at the client device, configuring the automated computing operation to be periodically performed based on the delta parameter.

In some implementations, determining the current metric and the future metric may include passing at least a portion of the account data and at least a portion of the inputted data to a machine learning algorithm.

In some implementations, the method may further include providing, at the client device, an indication of at least a portion of an output of the machine learning algorithm together with a selectable option to provide a veracity indicator to the computing system; receive the veracity indicator; and retrain the machine learning algorithm based on the veracity indicator.

In some implementations, the veracity indicator may define alternate data and wherein the retraining of the machine learning algorithm is based on the alternate data.

In some implementations, the method may further include: monitoring for a defined trigger condition; in response to detecting occurrence of the defined trigger condition, automatically obtaining further data using the access token; determining, based on the further data, whether a particular parameter indicated in the further data varies from a corresponding parameter indicated in the account data by a threshold amount; and in response to determining that the particular parameter indicating in the further data varies from the corresponding parameter indicated in the account data by the threshold amount: redetermining one or both of the current metric or the future metric based on the further data; and redetermining the delta parameter based on one or both of the redetermined current metric and future metric.

In some implementations, the method may further include, in response to determining that the particular parameter indicated in the further data varies from the corresponding parameter indicated in the account data by the threshold amount, reconfiguring the automated computing operation to be periodically performed based on the redetermined delta parameter.

In some implementations, the method may further include, in response to determining that the particular parameter indicating in the further data varies from the corresponding parameter indicated in the account data by the threshold amount, providing, at the client device, a notification, the notification including a selectable option to initiate reconfiguring of the automated computing operation. The automated computing operation may be reconfigured to be periodically performed based on the redetermined delta parameter in response to detecting activation of the selectable option to initiate reconfiguring of the automated computing operation.

In some implementations, the defined trigger condition may be based on a time parameter. The method may further include determining the time parameter based on the account data.

In some implementations, the future metric may be determined by: obtaining a time frame to be associated with the future metric; determining a projected value parameter based on the time frame; and determining the future metric based on the projected value parameter.

In some implementations, the projected value parameter may be determined based on a trend indicator for a location defined in one or both of the account data and the inputted data.

In some implementations, the current metric may be a current shelter metric and wherein the future metric is a future shelter metric.

In yet another aspect, a computing system is described. The computing system may include a communications module. The computing system may include a processor coupled to the communications module. The computing system may include a memory coupled to the processor. The processor may store instructions that, when executed by the computing system, cause the computing system to perform a method described herein. For example, the instructions may, when executed by the computing system, cause the computing system to: using an access token, obtain account data associated with a particular account at a data provider system via an access interface associated with the data provider system; receive inputted data from a client device associated with the particular account at the computing system; based on the account data and the inputted data, determine a current metric and a future metric; determine a delta parameter based on the current metric and the future metric; provide, at the client device, a selectable option to initiate an automated computing operation based on the delta parameter; and after activation of the selectable option at the client device, configure the automated computing operation to be periodically performed based on the delta parameter.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term account or user account may be used interchangeably with "logical storage area" or "record" or "record in a database."

In the present application, the terms "transferor" and "transferee" may be used interchangeably with "sender" and "recipient", respectively, in the context of describing transfers of resources. In some cases, the terms "payor" or "payee" may be used in the example of monetary resources.

FIG. 1 is a block diagram illustrating an operating environment of an example embodiment. Various components cooperate to provide a system 100 which may be used, for example, to perform an operation. As shown, the system 100 may include a client device 108. The client device 108 may be associated with a first logical storage area.

The system 100 may include a computing system 130. The computing system 130 may be or more include one or more servers. By way of example, the computing system 130 may include a web server. The computing system 130 may manage the first logical storage area. The first logical storage area may be a logical storage area, such as an account, in a data store 135. The data store 135 may be or may include a database. In at least some implementations, the logical storage area is a record in the database. The record may represent or be associated with a particular account.

The computing system 130 may, as will be explained in greater detail below, configure a computing operation to be performed. The computing operation may also be referred to as a computing process. The computing operation may be an automated computing operation. For example, the computing operation may be a computing operation which, once configured, is performed automatically without human intervention or action. In at least some implementations, the computing operation may be configured to be performed periodically and/or configured to be performed in response to a defined trigger condition. By way of example, in one implementation, the computing operation may be configured to be performed in response to detection of a computing operation initiated at another computing system.

The computing operation that is configured by the computing system 130 may, in some implementations, include a database operation. By way of example, the computing operation may include a transfer, such as a data transfer. The transfer may transfer data between accounts. The transfer may transfer a stored value indicator or a portion thereof in one logical storage area to another logical storage area.

The computing system 130 may also be referred to as a computing operation configuration system. In at least some implementations, the computing system 130 may retrieve data from another system (such as a data provider system 140) in order to configure the computing operation and, in at least some such implementations, the computing system 130 may be referred to as a data retrieving system and/or a data consuming system and/or a data receiving system. In at least some implementations in which the computing system 130 manages a database, the computing system 130 may be referred to as a database management system. For example, the computing system 130 may be referred to as a first database management system.

The system 100 may also include another computing system, such as a data provider system 140. The data provider system 140 may provide data to the computing system 130. The data that is provided may be retrieved from and/or based on data in a data store 145 associated with the data provider system 140. The data store 145 may be or may include a database. The database may include a plurality of logical storage areas. In at least some implementations, the logical storage areas may be records in the database. The records may represent or be associated with respective accounts at the data provider system 140. By way of example, in one implementation, the accounts may be or may include bank accounts.

The data that is provided from the data provider system 140 to the computing system 130 may be data that is associated with a particular account at the data provider system 140. For example, the data sent from the data provider system 140 to the computing system 130 may be associated with an account indicated by a data request message sent from the computing system 130 to the data provider system 140. The data request message may include an access token and the access token may grant the computing system 130 access to data in a specific logical storage area, such as a specific record or account. The data that is sent from the data provider system 140 to the computing system 130 may be data obtained from or based on the specific logical storage area.

The data that is provided from the data provider system 140 to the computing system 130 and/or the data in the logical storage areas of the data store 135 may be of various types. For example, such data may include any one or more of the following: entity definition data, log data, contact information, balance indicators or other types of data. Entity definition data may include a name, username, unique identification number, and/or other identifier associated with the logical storage area. Log data may include data from one or more data logs. By way of example, log data may include historical data. Historical data may include, for example, a list of one or more past computing operations performed in association with a particular entity, object, and/or logical storage area. By way of example, the past computing operations may include transfers, transactions and/or database operations. For example, the historical data may represent historical transfer data. Balance indicators may indicate an amount of resources represented in or by a logical storage area.

The data provider system 140 may include an interface, such as an application programming interface (API). The interface may be configured to receive and process data request messages from computing systems such as the computing system 130 of FIG. 1.

Accordingly, the access to the data from the data provider system 140 may be based on an access token. In one implementation, the computing system 130 may be a third-party provider (TPP) system which accesses data from a data provider system 140. In an implementation, the data provider system 140 may be an open banking data providing system and the computing system 130 may be an open banking data receiving system.

In some implementations, the computing system 130 may not obtain data from the data provider system 140 directly. Instead, in some implementations, data may be obtained via another system, which may be referred to as a data access platform 160. The data access platform 160 may act as the third-party provider (TPP) system which accesses data from a data provider system 140 and the computing system 130 may act as an agent system which receives data from the data provider system 140 via the data access platform 160. Use of the data access platform 160 may allow for efficiencies since the data access platform may integrate with numerous data provider systems. By using the data access platform 160, the computing system 130 does not need to be configured to integrate with such numerous data provider systems. Instead, the computing system 130 may rely upon the data access platform 160 for such functions and the data access platform may provide data access services to numerous computing systems 130 to allow such systems to obtain data from numerous data provider systems.

Any two or more of client device 108, the computing system 130, the data provider system 140, the first data store 135, the second data store 145 and the data access platform 160 may be coupled to one another through a network 150. The network 150 may include a public network, such as the Internet, and/or a private network.

The client device 108 is a computing device that may be associated with an object. The object may be or include an entity, such as a person or business. The object may be or include a system, such as a server or other type of computing system. The object may be referred to as an accountholder or a logical storage area holder, in some implementations. The client device 108 may be associated with an object, such as an entity, that is also associated with a first logical storage area, which may be a logical storage area at the first data store 135 associated with the computing system 130. The client device 108 may, additionally or alternatively, be associated with an object, such as an entity, that is also associated with a second logical storage area, which may be a logical storage area at the second data store 145 associated with the data provider system 140.

The records and/or logical storage areas may be or represent account data. The records may include data of various types and the nature of the data will depend on the nature of the computing system 130 and the data provider system 140. In one example, the first logical storage area and/or the second logical storage areas may be or represent bank accounts.

One or both of the first data store 135 and the second data store 145 may be provided in secure storage. The secure storage may be provided internally within the associated system or externally. For example, the first data store 135 may be internal or external to the computing system 130 and the second data store 145 may be internal or external to the data provider system 140. The secure storage may include one or more data centers. The data centers may, for example, store data with bank-grade security. In at least some implementations, one or both of the first data store 135 and the second data store 145 may be cloud-based data stores.

The computing system 130 and the data provider system 140 may be operated by different entities. That is, the computing system 130 may be associated with a first system operator and the data provider system 140 may be associated with a second system operator who is different than the first system operator. The computing system 130 may be, for example, associated with a first financial institution and the data provider system 140 may be associated with a second financial institution, different than the first.

The client device 108 may take a variety of forms such as a smartphone, a tablet computer, a wearable computer such as a head-mounted display or smartwatch, a laptop or desktop computer, or a computing device of another type. The client device 108 may be referred to as one or more of a client device, an electronic device, a node, an edge node, a computing device and a computing system.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, a telecommunications network, or the like.

Any two or more of the client device 108, computing system 130, data provider system 140, first data store 135, second data store 145 and the data access platform 160 may be in geographically disparate locations. Put differently, any two or more of the client device 108, computing system 130, data provider system 140, first data store 135, second data store 145 and the data access platform 160 may be remote from one another. Two or more of the client device 108, computing system 130, data provider system 140, first data store 135, second data store 145 and the data access platform 160 may communicate via the network 150.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
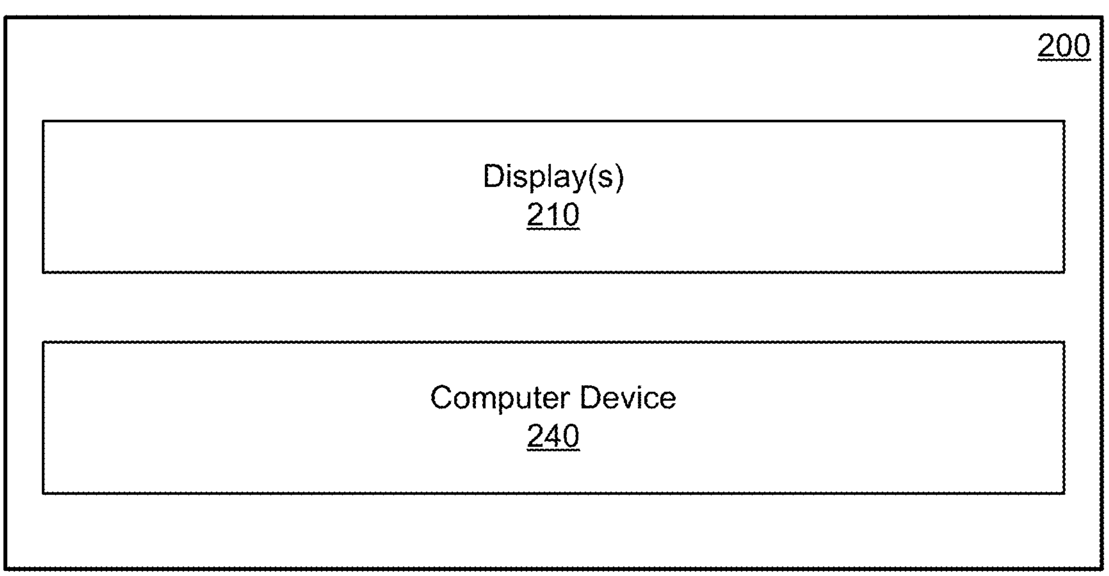
FIG. 2 is a simplified schematic diagram showing components of a computing device.

FIG. 2 is a simplified schematic diagram showing components of an exemplary computing device 200. The computing device 200 may include modules including, as illustrated, one or more displays 210 and a computer device 240. The computing device 200 may be or include one of the systems of FIG. 1. For example, in some implementations, an instance of the computing device 200 may operate as the client device 108. Another instance of the computing device 200 may operate as the computing system 130. Another instance of the computing device 200 may operate as the data provider system 140. Another instance of the computing device 200 may operate as the data access platform 160.

The one or more displays 210 may be or include a display module. The one or more displays 210 are used to display screens of a graphical user interface that may be used, for example, to communicate with the computing system 130 (FIG. 1) and/or the data provider system 140 (FIG. 1) and/or the data access platform 160. The one or more displays 210 may be internal displays of the computing device 200 (e.g., disposed within a body of the computing device).

The computer device 240 is in communication with the one or more displays 210. The computer device 240 may be or may include a processor which is coupled to the one or more displays 210.

Figure 3:
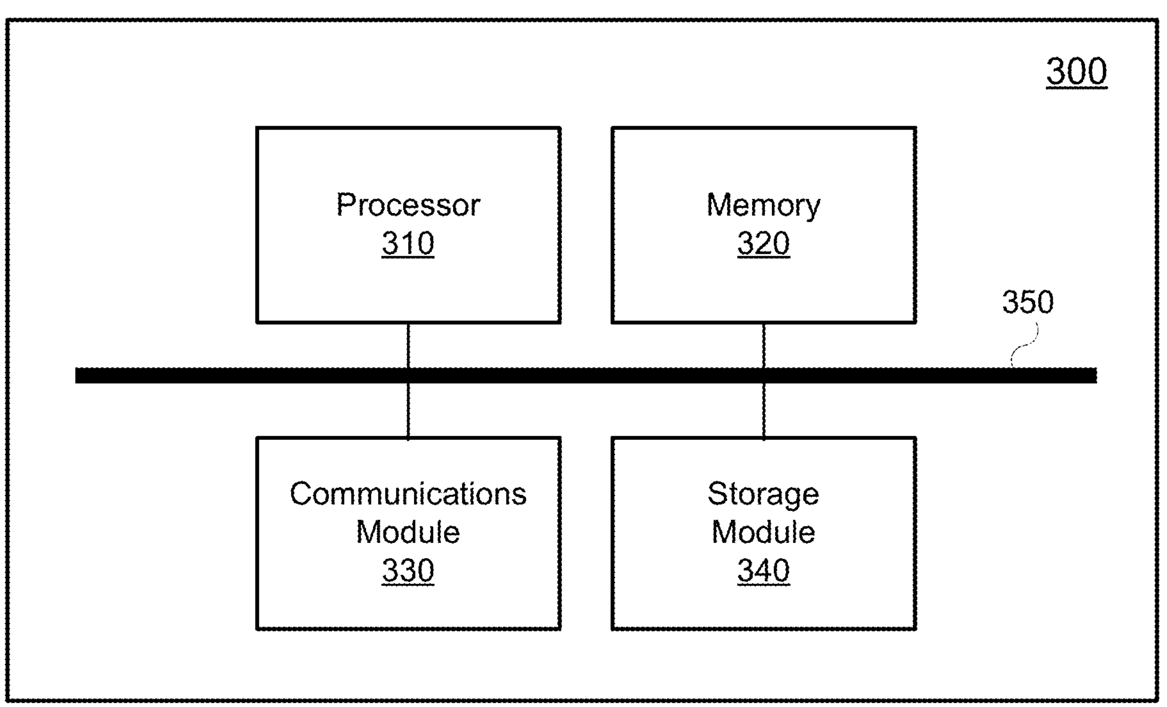
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the client device 108, the computing system 130, the data provider system 140, the first data store 135, the second data store 145 and/or the data access platform 160.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive, or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Where the example computer device 300 functions as the computing system 130 of FIG. 1, the storage module 340 may allow the example computing device 300 to access data, such as secure data, in the first data store 135. Likewise, where the example computer device 300 functions as the data provider system 140 of FIG. 1, the storage module 340 may allow the example computing device 300 to access data, such as secure data, in the second data store 145.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
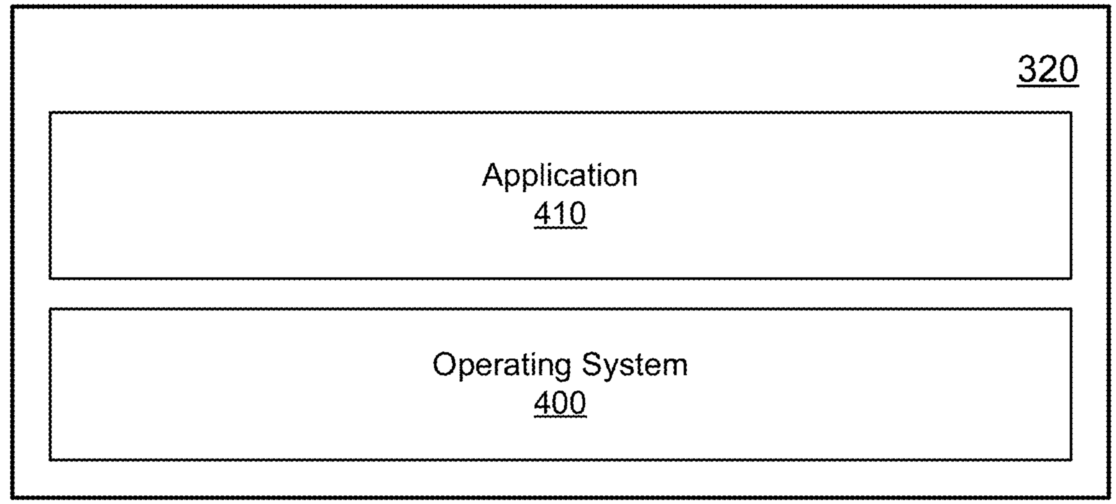
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the client device 108, the computing system 130, the data provider system 140 and/or the data access platform 160.

While a single application 410 is illustrated in FIG. 3, in operation the memory 320 may include more than one application 410 and different applications 410 may perform different operations. For example, in at least some embodiments in which the computer device 300 is functioning as the client device 108, the applications 410 may include one or more resource management applications. The resource management applications may be configured for secure communications with one or both of the computing system 130 and the data provider system 140. The resource management applications may provide various functions such as, for example, the ability to display data in a record in the first data store 135 and/or the second data store 145. In some implementations, one or more of the resource management applications may be a banking application which may, for example, be configured to display a quantum of value in one or more data records (e.g., display balances), configure or request that operations such as transfers of value (e.g., bill payments, email money transfers and other transfers) be performed, and perform other account management functions.

By way of further example, in at least some embodiments in which the computer device 300 functions as the client device 108, the applications 410 may include a web browser, which may also be referred to as an Internet browser. In at least some such embodiments, the computing system 130 and/or the data provider system 140 and/or the data access platform may be or include a web server that may serve one or more of interfaces such as interfaces of the type described herein. The web server may cooperate with the web browser and may serve as an interface when the interface is requested through the web browser. For example, the web browser may serve as a resource management interface such as a mobile banking interface. The resource management interface may provide various resource management functions such as, for example, the ability to display a balance of resources defined in one or more data records (e.g., to display balances), configure or request that operations such as transfers of value (e.g., bill payments and other transfers) be performed, and other account management functions.

Figure 5:
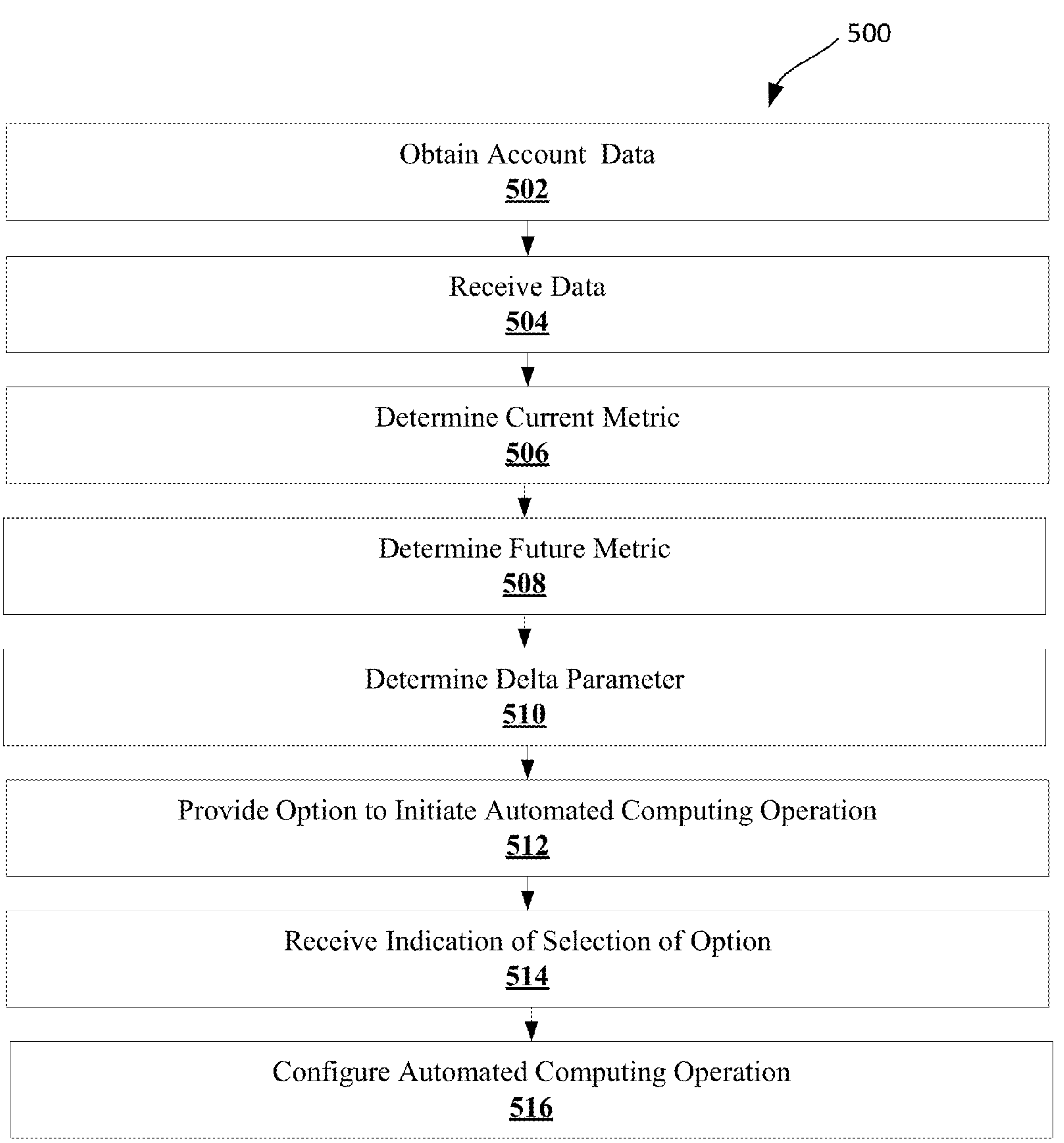
FIG. 5 shows a flowchart showing operations performed by a computing system in configuring an automated transfer in accordance with an example embodiment.

Reference is now made to FIG. 5, which shows, in flowchart form, an example method 500 of configuring an automated computing operation. The method 500 may be implemented by a computing system such as the computing system 130 of FIG. 1. For example, a software module may be configured to cause the computing system 130 of FIG. 1 to implement the method 500. The method 500 may be performed, for example, by the processor 310 (FIG. 3) of a computing device 300 executing software comprising instructions such as may be stored in the memory 320 of the computing device 300. More particularly, processor-executable instructions may, when executed, configure a processor 310 of a computing system such as the computing system 130 of FIG. 1 to perform all or parts of the method 500 or a portion thereof.

In performing the method 500, the computing system 130 may cooperate with other systems and devices such as, for example, a client device 108 (FIG. 1) and/or a data provider system 140 and/or a data access platform 160. Each of these devices may be configured with processor-executable instructions which cause such devices to perform methods which cooperate with the method 500. Accordingly, operations that are referred to below as being performed by the client device 108 may be included in a method that a processor of the client device 108 may perform. Similarly, operations that are referred to below as being performed by the computing system 130 may be included in a method which a processor of the computing system 130 may perform. Further, in performing such a method, the computing system 130 may cooperate with the data provider system 140 which may perform one or more other methods. Such methods may include any operations described herein as being performed by such devices. Further, it is contemplated that a method may be performed by a system that includes two or more of the computing system 130, the data provider system 140, the client device 108 and the data access platform 160, such that the method may include operations performed by multiple devices.

At an operation 502 of the method 500, the computing system 130 performing the method may obtain account data associated with a particular logical storage area at a data provider system 140. The particular logical storage area may be a particular account. In some implementations, the particular logical storage area may be a particular record in a database, such as in the data store 145 associated with the data provider system 140.

The account data may be obtained via an access interface associated with the data provider system 140. The access interface may be or may include an application programming interface (API). The API may be configured to receive one or more calls from another system, such as the computing system 130. The calls may include an instruction such as a data access request which may also be referred to as a request for data. The data access request may be a request for data associated with a particular logical storage area. The particular logical storage area may be defined in the data access request.

The account data may be obtained by the computing system 130 using an access token. For example, access to account data may only be provided to the computing system 130 with the consent of the entity that is associated with the account data.

Various techniques may be used for provisioning the computing system 130 and/or a data access platform 160 with an access token. For example, the client device 108 may be adapted to receive a signal indicating a user's consent to share data with another system, such as the computing system 130 and/or the data access platform 160, and may, in response, send an indication of consent to the data provider system 140. The data provider system 140 may then configure data sharing with the computing system 130 and/or the data access platform 160. For example, the data provider system 140 may provide an access token to the computing system 130 or, in some implementations, to the data access platform 160 which may act as an intermediary to access the account data on behalf of the computing system 130. Such operations may be performed prior to or during the operation 502 of the method 500.

The access token may be configured to allow the computing system 130 and/or the data access platform 160 to access data (e.g. through the API) associated with the entity that provided consent. For example, the access token may allow the computing system 130 and/or the data access platform 160 to access account data. The indication of consent that is sent to the data provider system 140 may specify a sharing permission, such as type(s) of data that the computing system 130 and/or the data access platform 160 is permitted to access. For example, the data store 145 may store various types of secure data and the indication of consent may indicate the specific type(s) of data that may be accessed. By way of example, the types may include one or more of entity definition data, log data, contact information, balance indicators or other types of data. Entity definition data may include a name, username, unique identification number, and/or other identifier associated with the logical storage area. Log data may include data from one or more data logs. By way of example, log data may include historical data. Historical data may include, for example, a list of one or more past computing operations performed in association with a particular entity, object, and/or logical storage area. By way of example, the past computing operations may include transfers, transactions and/or database operations. The historical data may include historical transfer data. Balance indicators may indicate an amount of resources represented in or by a logical storage area.

The indication of consent may, additionally or alternatively, specify a type of access that is to be provided. By way of example, the indication may indicate whether the computing system 130 and/or the data access platform 160 is permitted to: 1) access account data for a particular logical storage area in the data store 145; 2) initiate computing operations in association with the particular logical storage area in the data store 145; or 3) both access account data for a particular logical storage area in the data store 145 and initiate computing operations in association with the particular logical storage area in the data store 145.

The data provider system 140 may configure data sharing in accordance with the indication of consent. For example, any permissions or restrictions or preferences indicated in the indication of consent may be implemented by the data provider system 140.

The access token may be issued by the data provider system 140 or may be issued by a separate system (referred to as a token service provider, or TSP), which may issue tokens on behalf of the data provider system 140. The access token represents the authorization of a specific computer system or server to access specific parts of the data in the data store 145. The access token may, for example, be an OAuth token or a variation thereof. OAuth is an open standard for token-based authentication and authorization on the Internet. The OAuth 1.0 protocol was published as RFC 5849 and the OAuth 2.0 framework was published as RFC 6749 and bearer token usage as RFC 6750. All of these documents are incorporated herein by reference.

Accordingly, at the operation 502, the computing system 130 may obtain account data from the data provider system 140. Such data may be obtained using an access token. The account data that is obtained at the operation 502 may include, for example, one or more of entity definition data, log data, contact information, balance indicators or other types of data.

As noted above, in some implementations, during the operation 502 or prior to the operation 502, an indication of consent may be provided to the data provider system 140 from the client device 108. Reference will now briefly be made to FIGS. 6, 7 and 8 which illustrate interfaces 600, 700 and 800. One or more of the interfaces 600, 700, 800 may be displayed during operation 502 of the method 500 of FIG. 5.

Figure 6:
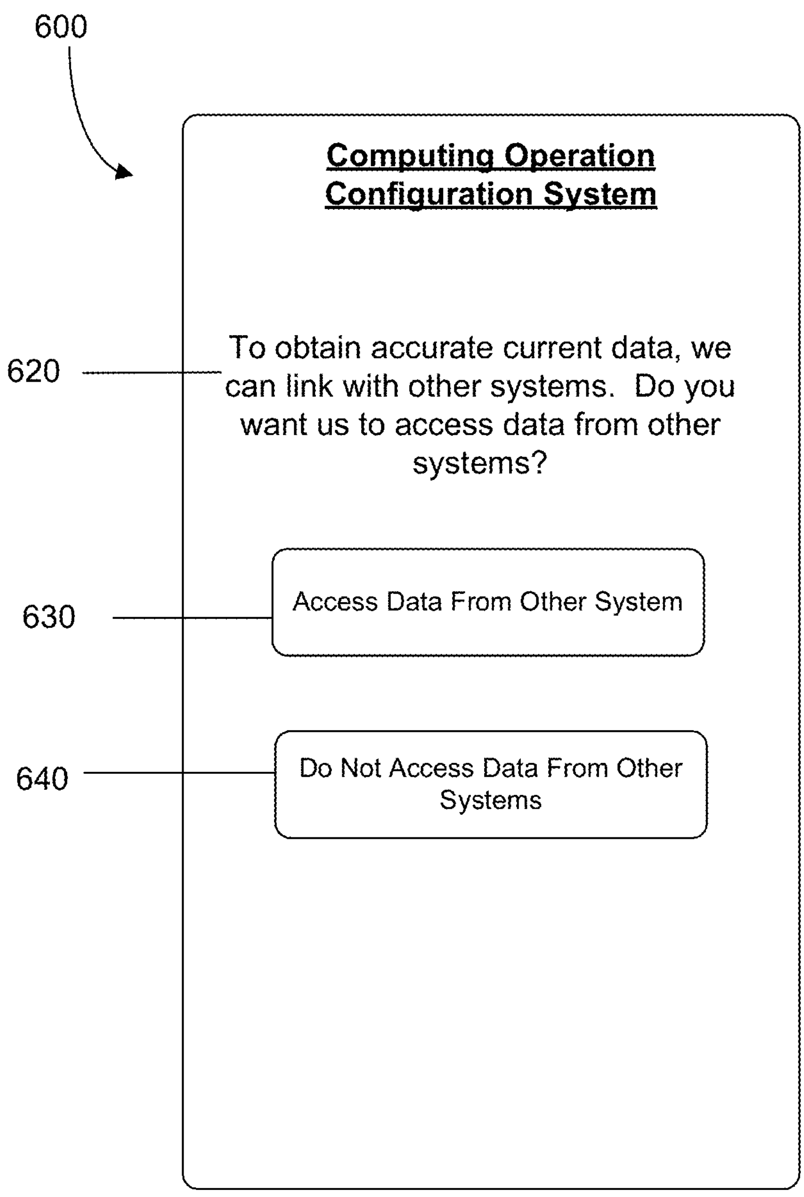
FIG. 6 is an example user interface in accordance with an example embodiment.

Referring to FIG. 6, a user interface 600 is illustrated. The user interface 600 may be displayed on the client device 108 during or prior to the operation 502 of the method 500 of FIG. 5. The user interface 600 allows for input of an instruction to configure the computing system 130 to obtain data from the data provider system 140. The example user interface 600 includes a prompt 620. In the example, the prompt 620 requests input of the instruction to configure the computing system 130 to obtain data from the data provider system 140. In the illustrated example, the user interface 600 includes a selectable option 630 to input an instruction to configure the computing system 130 to obtain data from the data provider system 140. The selectable option 630 may be an interface element, such as a button or virtual button. In the illustrated example, the user interface 600 includes a selectable option 640 to configure the computing system 130 to proceed without obtaining data from the data provider system 140. The selectable option 640 may be an interface element, such as a button or virtual button.

Selection of the selectable option 640 to configure the computing system 130 to proceed without obtaining data from the data provider system 140 may cause the method 500 to be performed without obtaining data from the data provider system 140. Selection of the selectable option 630 to input an instruction to configure the computing system 130 to obtain data from the data provider system 140 may initiate an operation that allows the computing system 130 to obtain data from the data provider system 140. By way of example, selection of the selectable option 630 may cause a further interface 700, such as an interface 700 of the type illustrated in FIG. 7, to be displayed on the client device 108.

Figure 7:
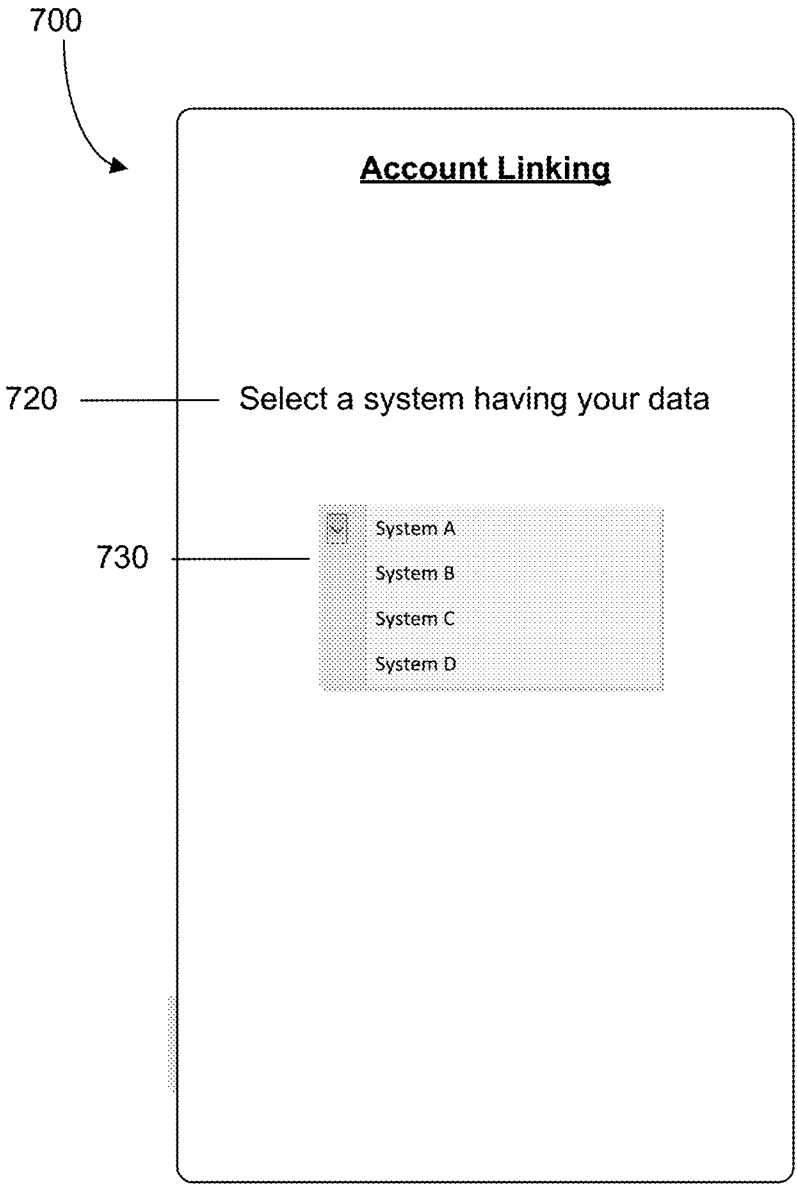
FIG. 7 is an example user interface in accordance with an example embodiment.
Figure 8:
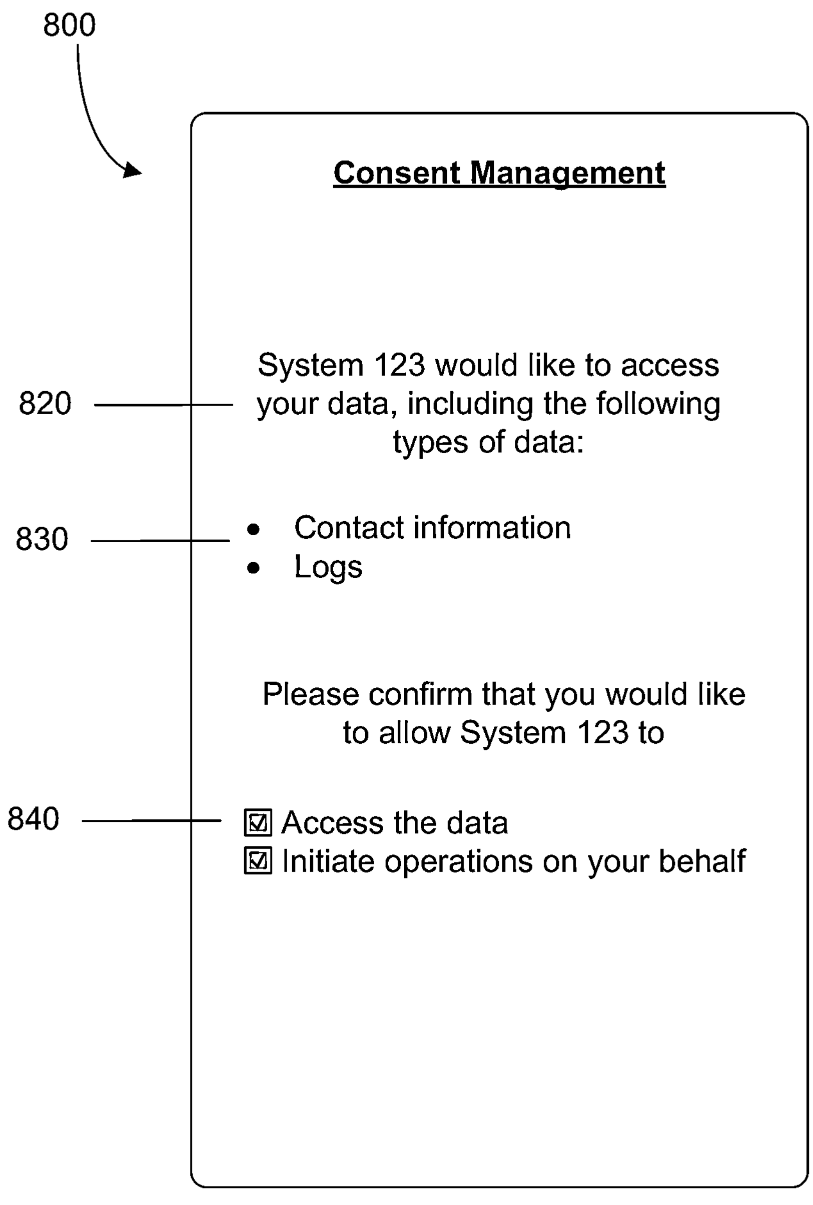
FIG. 8 is an example user interface in accordance with an example embodiment.

Referring to FIG. 7, an interface 700 is illustrated. The interface 700 may be displayed on the client device 108 in response to receipt of an instruction to configure the computing system 130 to obtain data from the data provider system 140. The interface 700 includes a prompt 720. The prompt 720 requests input identifying a data provider system 140 that is to be used to access account data. More specifically, the prompt 720 requests input which indicates a data provider system 140 that is associated with a logical storage area, such as an account, for the user and/or client device 108. The interface 700 includes a selectable option 730 to input an instruction indicating a data provider system 140. The selectable option 730 may be an interface element, such as a button or virtual button. In the illustration example, the selectable option 730 includes a selectable list of data provider system 140. The selectable option 730 is configured for receiving input selecting one or, in some implementations, one or more, of the data provider systems 140.

One or more of the interfaces 600, 700 of FIGS. 6 and 7 may be output on the client device 108. One or more of the interfaces 600, 700 may be caused to be output by the computing system 130 and/or by the data access platform 160.

When the computing system 130 and/or the data access platform 160 receives an indication of a data provider system 140 via the interface 700, it may engage that data provider system 140. For example, the computing system 130 and/or the data access platform 160 may send a new data access configuration message to the data provider system 140. This message may be sent to the data provider system 140 via various channels. For example, in one implementation, the message may be sent via an application on the client device 108. The application may be an application that is associated with the data provider system 140. The application may be engaged via deep linking, for example. In another example, the message may be sent to the data provider system 140 via an application programming interface (API) associated with the data provider system 140. The message may request access to data from a particular logical storage area at the data store 145. By way of example, the message may request access to a logical storage area that is associated with the client device 108 or its user. The message may request access to particular types of data, which may be defined in the message. The message may identify the computing system 130 that is requesting access to the data.

The data provider system 140 may then obtain consent data, such as a sharing permission, from the client device 108. For example, the data provider system 140 may cause an interface 800 such as the type illustrated in FIG. 8 to be displayed. The interface 800 may request consent to share the requested data with the computing system 130. The interface 800 may be referred to as a consent management interface. The interface 800 may include a prompt 820. The prompt 820 may identify the computing system 130 requesting access to the data and it may include an indicator 830 of the type(s) of data involved in the request. The interface 800 includes one or more selectable options 840 for inputting an indication of consent, such as a sharing permission. The selectable option(s) may include interface elements such as buttons, check boxes, radio boxes, etc. In the illustrated example, the interface 800 allows for input of an instruction to allow the computing system 130 to access the data. In the illustrated example, the interface 800 allows for input of an instruction to allow the computing system 130 to initiate computing operations, such as transfers, from the logical storage area at the data store 145.

The data provider system 140 may receive input via the interface 800 and may configure data permissions for the computing system 130 and for the logical storage area based on the received input. By way of example, the data provider system 140 may receive input via the interface 800 and it may then permit the computing system 130 to access the data. It may do so by issuing an access token to the computing system 130. The access token may be of a type described above. The data provider system 140 configures the access token and the data provider system 140 such that the access token grants access only in accordance with the indication(s) of consent received via the interface 800. For example, data that the user did not provide consent to release is not released.

After the access token is provided to the computing system 130 and/or the data access platform 160, the computing system 130 may use the access token to access account data. For example, the computing system 130 may send a data access request to the data provider system 140 to request account data. The data access request may be sent to the data provider system 140 via an API associated with the data provider system 140. The data access request may include the access token or data generated from the access token and the data provider system 140 may, prior to releasing the account data, verify that the access token grants access to such account data. The data access request may indicate particular types of data that is requested to be accessed and/or may indicate the logical storage area from which the account data is to be obtained. The data provider system 140 retrieves the account data in accordance with the request and also with the indication of consent and provides such data to the computing system 130.

In some implementations, the computing system 130 may not access the account data directly from the data provider system 140. Instead, it may access the account data via a data access platform 160. In some such implementations, the computing system 130 may send a data access request to the data access platform 160 which may then retrieve the data from the data provider system 140 using the access token. The access token may, in at least some such implementations, remain stored at the data access platform 160. That is, the computing system 130 may not obtain the access token, though the access token may be used when the computing system 130 obtains the account data.

Accordingly, referring again to FIG. 5, at the operation 502, the computing system 130 may obtain the account data from the data provider system 140 using an access token. The data provider system 140 may be of a type described above; for example, with reference to FIG. 1.

The received account data may be processed by the computing system 130. Such processing may identify, for example, one or more recurring computing operations reflected in the account data. For example, the processing may identify one or more recurring transfers reflected in the account data. The transfers may be outgoing transfers; that is, transfers from the logical storage area at the data store 145 to another logical storage area. The processing may monitor for and identify particular types of transfers in account data, such as historical transfer data. For example, the processing may identify a transfer that reflects a rental transfer and/or a transfer that reflects a mortgage transfer and/or a transfer that reflects a utility transfer and/or a transfer that reflects a property tax transfer. Utility transfers may include, for example, transfers related to internet, phone, gas, water, electricity, or other utilities. In some implementations, the computing system 130 may, during the processing, determine, from the account data, one or more current shelter metrics. A shelter metric may be a periodic amount of value associated with shelter. For example, the current shelter metric may indicate an amount of value associated with rent and/or a mortgage. The current shelter metric may indicate a current cost associated with the user's current shelter.

The computing system 130 may identify particular types of transfers using a variety of processing techniques. For example, certain types of transfers may be identified based on a counterparty identifier for such transfers. The computing system 130 may compare the counterparty identifier in a particular transfer defined in historical transfer data to one or more identifiers in a list of counterparty identifiers. The list may map counterparty identifiers to categories. By way of example, a counterparty identifier of "AT&T" may be categorized as a transfer on account of Internet or telephone services in the list.

Other techniques may be used to identify particular types of transfers. For example, the computing system 130 may identify one or more of: transfers that occur with a certain period (e.g., monthly), transfers that are of a consistent amount, transfers that occur with a certain proximity to a beginning of the month, transfers that are above a defined minimum amount, and/or transfers that are below a defined maximum amount.

Figure 9:
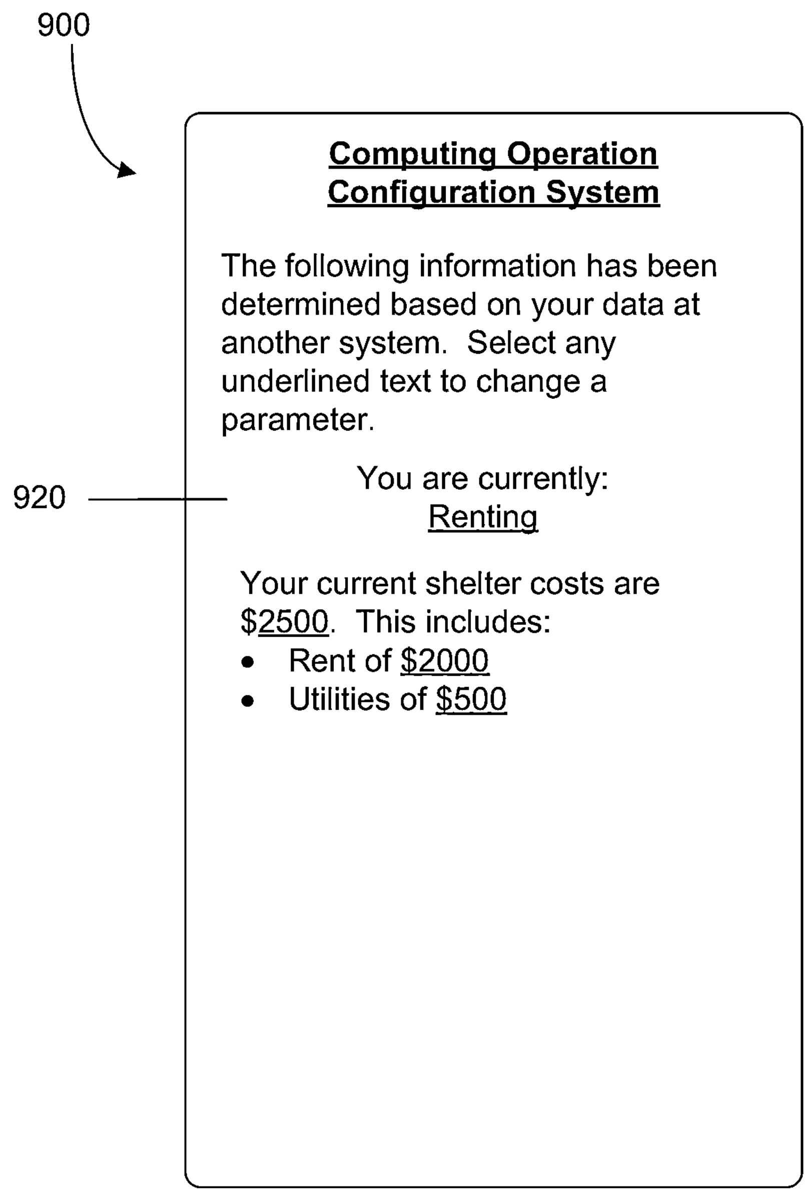
FIG. 9 is an example user interface in accordance with an example embodiment.

At an operation 504, the computing system 130 may receive inputted data from a client device associated with the account at the computing system. For example, the computing system 130 may receive data input by a user at the client device 108. Such input may be received via one or more interfaces. By way of example, referring to FIG. 9, an example interface 900 is illustrated. The example interface may include an indication 920 of data obtained from the account data. By way of example, the interface 900 may indicate a current shelter metric. In at least some implementations, the data obtained from the account data may be selectable. For example, the interface 900 may allow for input of data overriding or modifying the data determined by the computing system 130 from the account data. Accordingly, the computing system 130 may, in at least some implementations, receive input from the client device 108 modifying at least some data determined from the account data. By way of example, the computing system 130 may receive a modified current shelter metric. The modified current shelter metric may be received via the interface 900.

Figure 10:
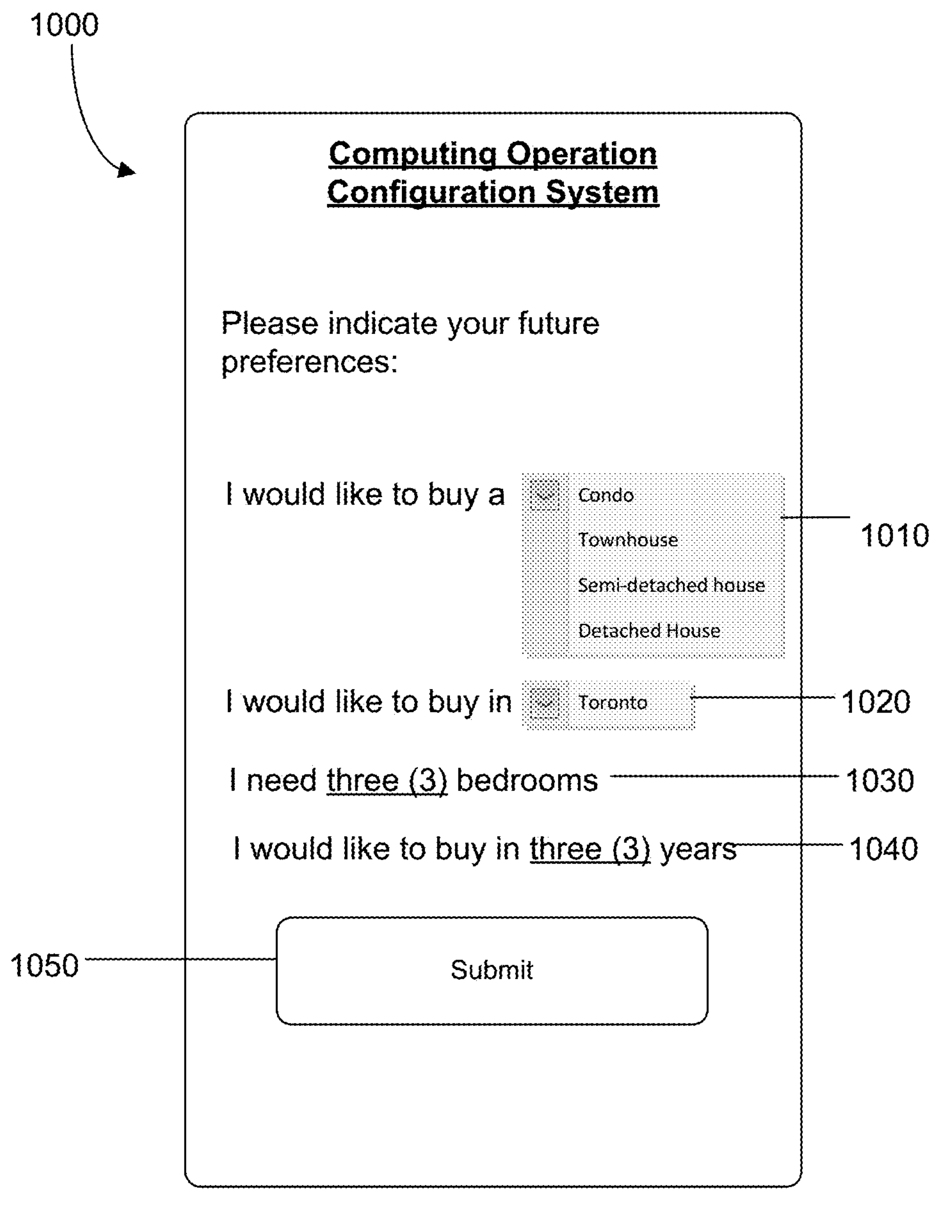
FIG. 10 is an example user interface in accordance with an example embodiment.

Referring to FIG. 10, an example interface 1000 may also allow for input of one or more parameters. These parameters may be referred to as inputted data, one received. The parameters may define one or more preferences. The preferences may be or include future shelter preferences. By way of example, the preferences may allow for input of a preferred future shelter type 1010 (e.g., condo, townhouse, semi-detached house, detached house), may allow for input of a location 1020, may allow for input of size parameter 1030 such as a number of bedrooms or square footage, and/or may allow for input of a time indicator 1040 such as a desired time of transition to the shelter type defined in the preferences. The preferences may be input via one or more interface elements. The interface 1000 may include a selectable option 1050 for causing the client device 108 to submit the preference(s) to the computing system 130.

The example interface 1000 may, in some implementations, be pre-populated with custom default preferences that are determined based on the account data. By way of example, in one implementation, the account data may include an age or date of birth and the time indicator may be pre-populated based on the age or date of birth. By way of further example, one or more of the preferences may be determined based on a balance associated with the logical storage area and/or based on an income reflected in the historical transfer data.

The computing system 130 may receive the inputted data (such as via the interface 1000) and may, in at least some implementations determine further data based on the inputted data. The computing system 130 may, based on the account data and the inputted data, determine a current metric (at an operation 506) and a future metric (at an operation 508). The current metric may be a current shelter metric such as a current cost of shelter. The future metric may be a future shelter metric such as future cost of shelter. In some implementations, the current metric may be determined based on the account data and/or based on the inputted data. For example, where data was input to override account data, that data may be used to determine the current metric. That data may be used alone or together with other account data that was not overridden with inputted data. Where no data was input to override the account data or where no option to override the account data was provided, the current metric may be determined based on the account data only. Similarly, the future metric may be determined based on the account data and/or based on the inputted data. By way of example, in one implementation, the computing system 130 may determine a current desired metric based on the inputted data and/or the account data. For example, the current desired metric may identify a current expected value of the house reflected in the preferences. For example, it may be a current cost of the preferred house. The current expected value may be a localized value. That is, the current expected value may be based, in part, on the location 1020. The current expected value may be based on one or more of the following: the location 1020, the preferred future shelter type 1010 and/or the size parameter 1030. The determination may be made based on a lookup in a database or other data structure. The lookup may be based on one or more of the following: the location 1020, the preferred future shelter type 1010 and/or the size parameter 1030. The computing system 130 may then determine a future expected value based on the time indicator 1040 and the current expected value. For example, the future expected value may be determined by applying an operation to the current expected value. The operation may be an inflation adjustment operation. The future expected value may be a predicted value of the desired house at a time reflected by the time indicator 1040.

The future expected value may take into account a value associated with a purchase of a house defined by the preferences. By way of example, the future expected value may represent a cost of the house defined by the preferences.

The computing system 130 may determine a future metric based on the current expected value and/or the future expected value. The future metric may represent an expected monthly cost of ownership of the house. The future metric may be determined based on one or more of: the future expected value, current or expected rates, an amortization period, expected utility costs, etc.

Accordingly, the computing system 130 may, at an operation 506, determine a current metric and, at an operation 508, determine a future metric.

In at least some implementations, one or both of the current metric and the future metric may be determined using a machine learning algorithm. For example, determining the current metric and/or the future metric may involve passing at least a portion of the account data and/or at least a portion of the inputted data to a machine learning algorithm. The machine learning algorithm may be previously trained to identify one or both of a current metric and a future metric. The machine learning algorithm may identify one or both of the current metric and the future metric based on parameters such as, for example, the location 1020, the preferred future shelter type 1010 and/or the size parameter 1030, the time indicator 1040, a balance associated with the logical storage area, one or more patterns in the historical transfer data, or other parameters.

In one example, the computing system 130 may determine the future metric by obtaining a time frame to be associated with the future metric, such as the time indicator 1040. The computing system may then determine a projected value parameter based on the time frame. For example, the projected value parameter may be the future expected value described above. Then, the computing system may determine the future metric based on the projected value parameter. The future metric may be, for example, a periodic amount associated with the house defined by the preferences. The periodic cost may be, for example, a monthly amount.

The projected value parameter, such as the future expected value, may be determined based on a trend indicator for a location defined in one or both of the account data and the inputted data. The trend indicator may be retrieved from memory, such as the data store 135, by the computing system 130 based on the location 1020. The trend indicator may indicate a rate of recent adjustment to house values defined at or near the location 1020. By way of example, the trend indicator may indicate a rate of appreciation and/or a rate of depreciation.

Referring still to FIG. 5, at an operation 510, the computing system 130 may determine a delta parameter. The delta parameter may be determined based on the current metric (as determined at the operation 506) and also based on the future metric (as determined at the operation 508). The delta parameter may be determined as the difference between the future metric and the current metric.

Figure 11:
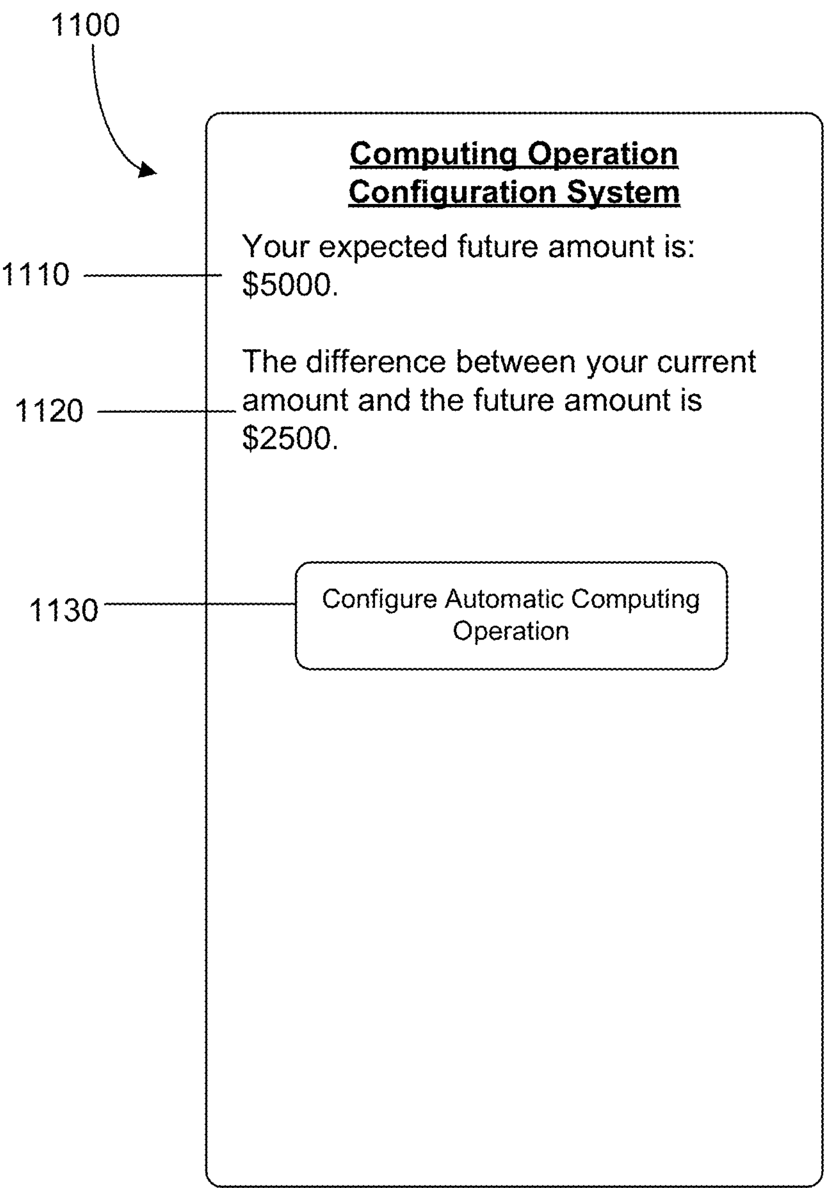
FIG. 11 is an example user interface in accordance with an example embodiment.

Referring briefly to FIG. 11, an example interface 1100 is illustrated. The computing system 130 may cause the interface 1100 to be displayed on the client device 108 following the operation 508 of the method 500. In some implementations, the interface 1100 may be displayed following the operation 510 of the method 500. The interface 1100 may output the future metric 1110 determined at the operation 508. The interface 1100 may output the delta parameter determined at the operation 510. For example, the interface 1100 may include a delta parameter indicator 1120.

The interface 1100 provides, at the client device 108, a selectable option 1130 to initiate an automated computing operation based on the delta parameter. The selectable option 1130 may be an interface element such as a virtual button. Referring again to FIG. 5, the method 500 may include an operation 512 at which the computing system 130 provides, at the client device 108, a selectable option to initiate an automated computing operation based on the delta parameter.

At an operation 514, the computing system 130 may receive an indication of a selection of the selectable option. After activation of the selectable option at the client device 108, the computing system 130 may, at an operation 516, configure the automated computing operation to be periodically performed based on the delta parameter. That is, in response to receiving the indication of a selection of the selectable option, the computing system 130 may configure the automated computing operation to be periodically performed based on the delta parameter. The computing operation, in at least some implementations, represents a transfer. The transfer may be a transfer for an amount indicated by the delta parameter. The transfer may be performed automatically after the computing operation is configured. That is, the transfer may be performed without any interaction by an operator or other human. The transfer may be performed periodically. For example, the transfer may be configured to be performed monthly.

In at least some implementations, the computing operation may be performed using the access token. For example, the computing operation may be a transfer associated with a logical storage area in the data store 145 and the transfer may be performed by sending a transfer instruction to the data provider system 140. The transfer instruction may include or be based on the access token and the data provider system 140 may perform the requested transfer in response to receiving the transfer instruction, after validating that the transfer instruction based on the access token. The transfer instruction may specify an amount and the amount may be based on the delta parameter.

In at least some implementations, the transfer that is performed as part of the automated computing operation may be a transfer to a special logical storage area. The special logical storage area may be a logical storage area that is associated with the same entity that is associated with the logical storage area from which the account data was obtained. The special logical storage area may be an earmarked logical storage area. The special logical storage area may be a savings account.

In at least some implementations, in order to reduce computer processing associated with automatic processing of the transfer, the transfer may be configured to be made automatically in response to a detected trigger condition. The trigger condition may be or include one or more of the following: the transfer may be made automatically in response to detecting another transfer reflecting a transfer for rent, the transfer may be made automatically in response to detecting receipt of an incoming transfer representing a payroll transfer, or the transfer may be made automatically at a time during a time period (such as a time of a month) that is determined from a historical transfer data to be associated with a payroll transfer and/or a transfer for rent. Conveniently, such triggering techniques may serve to reduce the use of processing resources associated with implementing the automatic transfers.

Figure 12:
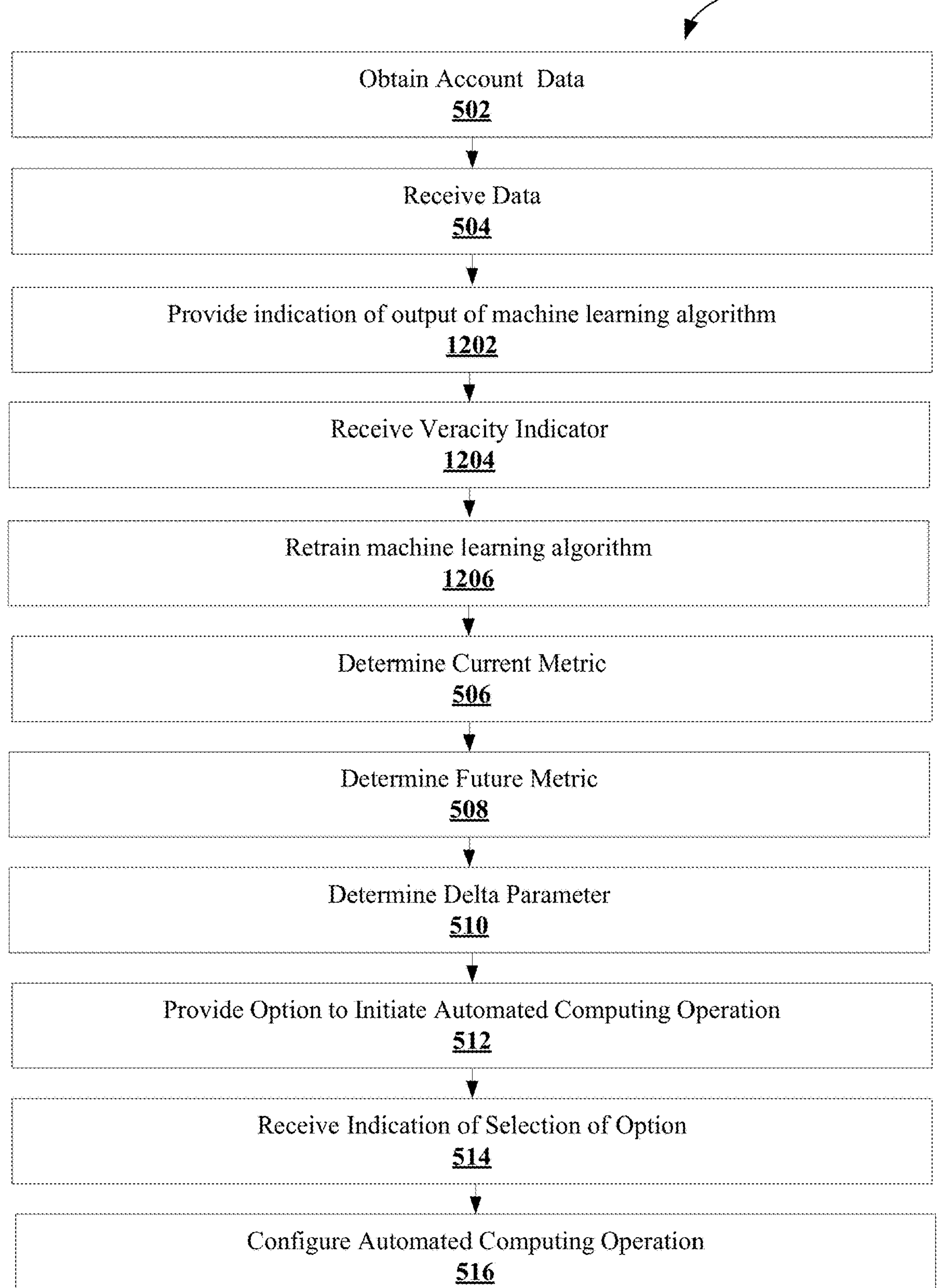
FIG. 12 shows a flowchart showing operations performed by a computing system in configuring an automated transfer.

Reference is now made to FIG. 12, which shows, in flowchart form, an example method 1200 of configuring an automated computing operation. The method 1200 may be implemented by a computing system such as the computing system 130 of FIG. 1. For example, a software module may be configured to cause the computing system 130 of FIG. 1 to implement the method 1200. The method 1200 may be performed, for example, by the processor 310 (FIG. 3) of a computing device 300 executing software comprising instructions such as may be stored in the memory 320 of the computing device 300. More particularly, processor-executable instructions may, when executed, configure a processor 310 of a computing system such as the computing system 130 of FIG. 1 to perform all or parts of the method 1200 or a portion thereof.

In performing the method 1200, the computing system 130 may cooperate with other systems and devices such as, for example, a client device 108 (FIG. 1) and/or a data provider system 140 and/or a data access platform 160. Each of these devices may be configured with processor-executable instructions which cause such devices to perform methods which cooperate with the method 1200. Accordingly, operations that are referred to below as being performed by the client device 108 may be included in a method which a processor of the client device 108 may perform. Similarly, operations that are referred to below as being performed by the computing system 130 may be included in a method which a processor of the computing system 130 may perform. Further, in performing such a method, the computing system 130 may cooperate with the data provider system 140 which may perform one or more other methods. Such methods may include any operations described herein as being performed by such devices. Further, it is contemplated that a method may be performed by a system that includes two or more of the computing system 130, the data provider system 140, the client device 108 and the data access platform 160, such that the method may include operations performed by multiple devices.

The method 1200 of FIG. 12 includes a number of operations in common with the method 500 of FIG. 5. The discussion of such operations will not be repeated in at length but like reference numerals indicate like operations.

The method 1200 may include the operation 502 at which account data is obtained and the operation 504 at which inputted data is obtained. Such operations may be performed as described above with reference to the method 500 of FIG. 5.

Next, at an operation 1202, the computing system 130 may provide, at the client device 108, an indication of at least a portion of an output of a machine learning algorithm. The indication may be provided together with a selectable option to provide a veracity indicator to the computing system 130. The indication may be provided on an interface 900 of the type described above with reference to FIG. 9 and/or an interface 1000 of the type described above with reference to FIG. 10. For example, in one example, an indication 920 of data obtained from the account data, such as a current shelter metric, may be determined using the machine learning algorithm and this indication 920 may be displayed on an interface that includes a selectable option to provide a veracity indicator related to the current shelter metric. The veracity indicator may in some implementations, be input by modifying the displayed data. For example, when the user modifies the data, this modification may be interpreted by the computing system 130 as an indication that the determined data was incorrectly determined. Other data, such as data of the type illustrated in FIG. 10 may be displayed and a veracity indicator may be input with respect to such data.

Next, at an operation 1204, the computing system 130 may receive the veracity indicator. In some instances, such as instances in which the interface 900, 1000 allows for modification of the determined data, the veracity indicator may define alternate data. That is, the veracity indicator may indicate the correct data.

Next, at an operation 1206, the computing system 130 may retrain the machine learning algorithm based on the veracity indicator. That is, the account data and the veracity indicator may form part of a training set that may be used to retrain the machine learning algorithm. Where the veracity indicator defines alternate data, the retraining of the machine learning algorithm may be based on the alternate data.

The method 1200 of FIG. 12 may include the other operations 506 to 516 of the method 500 of FIG. 5.

The methods 500, 1200 of FIGS. 5 and 12 may be adaptive and may be configured to automatically adapt to certain changing conditions. For example, reference is now made to FIG. 13, which shows, in flowchart form, an example method 1200 of automatically re-configuring an automated computing operation. The method 1300 may be implemented by a computing system such as the computing system 130 of FIG. 1. For example, a software module may be configured to cause the computing system 130 of FIG. 1 to implement the method 1300. The method 1300 may be performed, for example, by the processor 310 (FIG. 3) of a computing device 300 executing software comprising instructions such as may be stored in the memory 320 of the computing device 300. More particularly, processor-executable instructions may, when executed, configure a processor 310 of a computing system such as the computing system 130 of FIG. 1 to perform all or parts of the method 1300 or a portion thereof.

In performing the method 1300, the computing system 130 may cooperate with other systems and devices such as, for example, a client device 108 (FIG. 1) and/or a data provider system 140 and/or a data access platform 160. Each of these devices may be configured with processor-executable instructions which cause such devices to perform methods which cooperate with the method 1300. Accordingly, operations that are referred to below as being performed by the client device 108 may be included in a method which a processor of the client device 108 may perform. Similarly, operations that are referred to below as being performed by the computing system 130 may be included in a method which a processor of the computing system 130 may perform. Further, in performing such a method, the computing system 130 may cooperate with the data provider system 140 which may perform one or more other methods. Such methods may include any operations described herein as being performed by such devices. Further, it is contemplated that a method may be performed by a system that includes two or more of the computing system 130, the data provider system 140, the client device 108 and the data access platform 160, such that the method may include operations performed by multiple devices.

Figure 13:
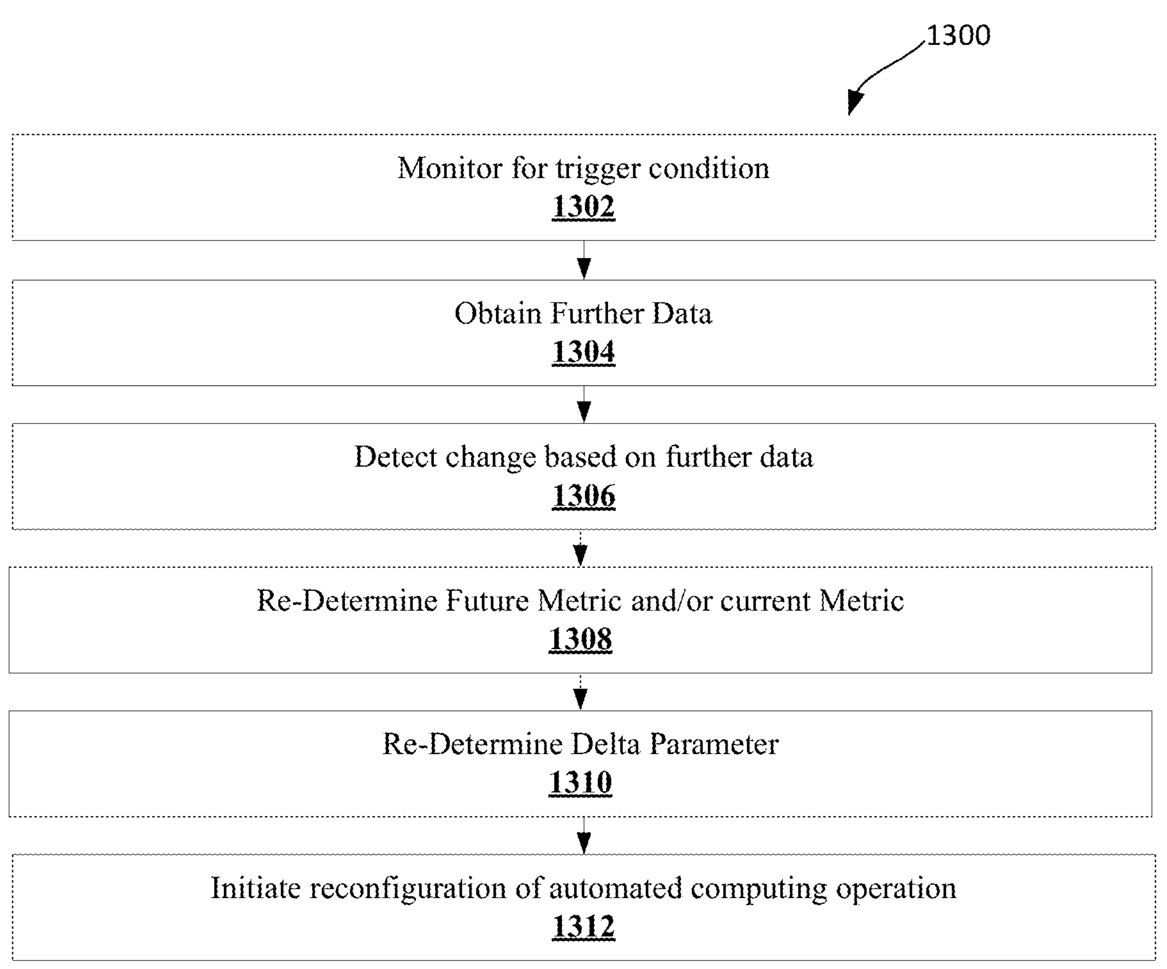
FIG. 13 shows a flowchart showing operations performed by a computing system in initiating reconfiguration of an automated computing operation in accordance with an example embodiment.

The method 1300 of FIG. 13 may be performed after the method 500 of FIG. 5, the method 1200 of FIG. 12 or a suitable variation thereof.

At an operation 1302, the computing system 130 may monitor for a defined trigger condition. The trigger condition may, in some implementations, be based on a time parameter. The time parameter may be determined by the computing system 130 from the account data obtained at the operation 502 of one of the methods 500, 1200. The time parameter may, for example, represent or be determined based on an expected time during a time period (such as a time of a month) that is determined from historical transfer data to be associated with a transfer for rent. By way of example, the computing system 130 may determine the date of the month when a transfer for rent typically occurs. The computing system may check for changes in rent at or soon after (e.g., within a defined number of days after, such as 2 days after) the date of the month when the transfer for rent typically occurs. Conveniently, this technique may serve to reduce computing requirements since monitoring is only performed on a date when it is likely that the monitoring will detect changes. Further, this technique may allow the computing system 130 to react quickly to any changes.

In response to detecting the trigger condition at the operation 1302, the computing system 130 may perform one or more operations. First, at an operation 1304, the computing system 130 may, in response to detecting occurrence of the defined trigger condition, automatically obtain further data. The further data may be obtained using the access token. The further data may be account data. The further data may be account data that is the same or similar to the account data obtained at the operation 502 of the method 500 or the method 1200. The further data may include fresher account data than was obtained at the operation 502.

At an operation 1306, the computing system may determine, based on the further data, whether a particular parameter indicated in the further data varies from a corresponding parameter indicated in the account data by a threshold amount. By way of example, the particular parameter may be a current metric such as a current shelter metric. The threshold may be an absolute threshold or a relative threshold, such as a percentage.

At the operation 1308, the computing system 130 may, in response to determining that the particular parameter indicating in the further data varies from the corresponding parameter indicated in the account data by the threshold amount (at the operation 1306), redetermine one or both of the current metric or the future metric based on the further data and, at an operation 1310, redetermine the delta parameter based on one or both of the redetermined current metric and future metric. The operations 1308 and 1310 may be performed in a manner that is the same or similar to the operations 506, 508 and 510 of the method 500 of FIG. 5.

At an operation 1312, in response to determining that the particular parameter indicated in the further data varies from the corresponding parameter indicated in the first data by the threshold amount, the computing system 130 may reconfigure the automated computing operation to be periodically performed based on the redetermined delta parameter. In some implementations, this reconfiguration may be automatically performed without any input from an operator or user. In some implementations, in response to determining that the particular parameter indicating in the further data varies from the corresponding parameter indicated in the first data by the threshold amount, the computing system 130 may provide, at the client device, a notification. The notification may include a selectable option to initiate reconfiguring of the automated computing operation. Then, the automated operation may be reconfigured to be periodically performed based on the redetermined delta parameter in response to detecting activation of the selectable option to initiate reconfiguring of the automated computing operation. In this implementation, a significant change in a current metric triggers a notification which allows the user to input an instruction to reconfigure the automated computing operation.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing system comprising:

a communications module;

a processor coupled to the communications module; and a memory coupled to the processor storing instructions that, when executed by the computing system, cause the computing system to:

using an access token, obtain account data associated with a particular account at a data provider system via an access interface associated with the data provider system;

receive inputted data from a client device associated with the particular account at the computing system;

based on the account data and the inputted data, determine a current metric and a future metric, wherein determining one or both of the current metric and future metric includes passing at least a portion of the account data and at least a portion of the inputted data to a machine learning algorithm;

determine a delta parameter based on the current metric and the future metric;

provide, at the client device, a selectable option to initiate an automated computing operation based on the delta parameter;

after activation of the selectable option at the client device, configure the automated computing operation to be periodically performed based on the delta parameter;

provide, at the client device, an indication of at least a portion of an output of the machine learning algorithm together with a selectable option to provide a veracity indicator to the computing system;

receive the veracity indicator; and retrain the machine learning algorithm based on the veracity indicator.

2. The computing system of claim 1, wherein the veracity indicator defines alternate data and wherein the retraining of the machine learning algorithm is based on the alternate data.

3. The computing system of claim 1, wherein the instructions further configure the processor to:

monitor for a defined trigger condition;

in response to detecting occurrence of the defined trigger condition, automatically obtain further data, using the access token;

determine, based on the further data, whether a particular parameter indicated in the further data varies from a corresponding parameter indicated in the account data by a threshold amount; and in response to determining that the particular parameter indicating in the further data varies from the corresponding parameter indicated in the account data by the threshold amount:

redetermine one or both of the current metric or the future metric based on the further data; and redetermine the delta parameter based on one or both of the redetermined current metric and future metric.

4. The computing system of claim 3, wherein the instructions further configure the processor to:

in response to determining that the particular parameter indicated in the further data varies from the corresponding parameter indicated in the account data by the threshold amount:

reconfigure the automated computing operation to be periodically performed based on the redetermined delta parameter.

5. The computing system of claim 4, wherein the instructions further configure the processor to:

in response to determining that the particular parameter indicating in the further data varies from the corresponding parameter indicated in the account data by the threshold amount:

provide, at the client device, a notification, the notification including a selectable option to initiate reconfiguring of the automated computing operation, wherein the automated computing operation is reconfigured to be periodically performed based on the redetermined delta parameter in response to detecting activation of the selectable option to initiate reconfiguring of the automated computing operation.

6. The computing system of claim 3, wherein the defined trigger condition is based on a time parameter and wherein the instructions further configure the processor to:

determine the time parameter based on the account data.

7. The computing system of claim 1, wherein the future metric is determined by:

obtaining a time frame to be associated with the future metric;

determining a projected value parameter based on the time frame; and determining the future metric based on the projected value parameter.

8. The computing system of claim 7, wherein the projected value parameter is determined based on a trend indicator for a location defined in one or both of the account data and the inputted data.

9. The computing system of claim 1, wherein the current metric is a current shelter metric and wherein the future metric is a future shelter metric.

10. A computer-implemented method comprising:

using an access token, obtaining account data associated with a particular account at a data provider system via an access interface associated with the data provider system;

receiving inputted data from a client device associated with the particular account at a computing system;

based on the account data and the inputted data, determining a current metric and a future metric, wherein determining one or both of the current metric and future metric includes passing at least a portion of the account data and at least a portion of the inputted data to a machine learning algorithm;

determining a delta parameter based on the current metric and the future metric;

providing, at the client device, a selectable option to initiate an automated computing operation based on the delta parameter;

after activation of the selectable option at the client device, configuring the automated computing operation to be periodically performed based on the delta parameter;

provide, at the client device, an indication of at least a portion of an output of the machine learning algorithm together with a selectable option to provide a veracity indicator to the computing system;

receive the veracity indicator; and retrain the machine learning algorithm based on the veracity indicator.

11. The method of claim 10, wherein the veracity indicator defines alternate data and wherein the retraining of the machine learning algorithm is based on the alternate data.

12. The method of claim 10, further comprising:

monitoring for a defined trigger condition;

in response to detecting occurrence of the defined trigger condition, automatically obtaining further data using the access token;

determining, based on the further data, whether a particular parameter indicated in the further data varies from a corresponding parameter indicated in the account data by a threshold amount; and in response to determining that the particular parameter indicating in the further data varies from the corresponding parameter indicated in the account data by the threshold amount:

redetermining one or both of the current metric or the future metric based on the further data; and redetermining the delta parameter based on one or both of the redetermined current metric and future metric.

13. The method of claim 12, further comprising:

in response to determining that the particular parameter indicated in the further data varies from the corresponding parameter indicated in the account data by the threshold amount:

reconfiguring the automated computing operation to be periodically performed based on the redetermined delta parameter.

14. The method of claim 13, further comprising:

in response to determining that the particular parameter indicating in the further data varies from the corresponding parameter indicated in the account data by the threshold amount:

providing, at the client device, a notification, the notification including a selectable option to initiate reconfiguring of the automated computing operation, wherein the automated computing operation is reconfigured to be periodically performed based on the redetermined delta parameter in response to detecting activation of the selectable option to initiate reconfiguring of the automated computing operation.

15. The method of claim 12, wherein the defined trigger condition is based on a time parameter and wherein the method further includes:

determining the time parameter based on the account data.

16. The method of claim 10, wherein the future metric is determined by:

obtaining a time frame to be associated with the future metric;

determining a projected value parameter based on the time frame; and determining the future metric based on the projected value parameter.

* * * * *